Fig.1.

Sept. 8, 1959   W. P. FRANKENSTEIN   2,903,174
CARTONS

Filed Nov. 14, 1955   9 Sheets-Sheet 8

Fig.19.

INVENTOR.
WILLIAM P. FRANKENSTEIN
BY
Joseph A. Rave
Attorney

Sept. 8, 1959 W. P. FRANKENSTEIN 2,903,174
CARTONS

Filed Nov. 14, 1955 9 Sheets-Sheet 9

INVENTOR.
WILLIAM P. FRANKENSTEIN
BY
Joseph A. Rave
Attorney

United States Patent Office 2,903,174
Patented Sept. 8, 1959

2,903,174

CARTONS

William P. Frankenstein, Roselawn, Ohio

Application November 14, 1955, Serial No. 546,760

10 Claims. (Cl. 229—16)

This invention relates to improvements in boxes, cartons or baskets, particularly of the knocked-down variety and in which, at least, the carton, box, or basket is formed of a single blank.

The box, carton or basket, either term may hereinafter be used to include the other, of this invention primarily contemplates having two sides, or opposed walls, at an angle to one another in the fashion of the old and well known "berry basket." While it is the understanding that the carton, box or basket of the present invention may find a particular use in packaging and displaying small fruits, berries and even vegetables, its use is by no means limited to the same.

The principal object of the present invention is the provision of a carton, box or basket formed of a single blank and in a knocked-down condition which will safely contain, ship and display goods, whether of a fresh nature or otherwise.

Another object of this invention is the provision of a box, carton or basket for accomplishing the foregoing object with which may be employed an advertising and display panel and/or a suitable cover.

Another object of this invention is the provision of a box, carton or basket for accomplishing the foregoing objects made from a single blank that includes, at least, the said display or advertising panel that upstands from the upper edge of the box, carton or basket, per se.

A still further object of this invention is the provision of a knocked-down carton, box or basket for accomplishing the foregoing objects with which may be employed a cover formed of a second blank and removably attachable to the carton, box, or basket for preventing loss of contents therefrom.

It is also an object of this invention to provide a cover and a display or advertising panel for use with the erected box, carton or basket formed of a single blank and erected from a knocked-down position and which cover and display panel is formed from a second blank and removably attached to the said erected carton, box or basket.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 13 is an extended plan view of a further modified blank for providing a carton embodying the principles of the present invention.

Throughout the several views of the drawings similar reference characters are employed to denote the same or similar parts or elements.

There is disclosed in this application several modifications of the underlying invention, each embodying similar principles and each providing a box, carton or basket that may be employed for the purpose of displaying, shipping and containing merchandise whether of a solid nature or of the nature of "fresh" or "green" goods. By the latter terms is meant, as noted above, small fruits, berries, small vegetables, and the like.

The box of the present invention has two opposed sides outwardly and upwardly flaring, or diverging, whereby the upper open end thereof is of greater area than the base or bottom so that a greater amount of the box contents may be viewed. As will presently be made clear the said box is formed from a single blank and may include in said blank a display or advertising panel to upstand from the box and with which box a removable cover, formed from a second blank, is employed but which removable cover may include the advertising or display panel that upstands from the box and in which event would not be incorporated in the box blank.

The various modifications herein disclosed will be described in succession insofar as said modifications differ or vary from each other.

Specifically the modification illustrated in Figs. 1 to 6, inclusive, is formed from a single blank comprising a main or bottom panel 25 having its edges defined by score or fold lines 26, 27, 28 and 29, said score or fold lines integrally, hingedly, connect with the bottom panel extensions which form in the erected carton the front, back and end walls. Accordingly, score or fold lines 26 and 28, respectively, connect with the bottom panel similar extensions 30 which in the erected carton form the end walls; score or fold line 27 hingedly connects with the bottom panel an extension 31 which in the erected carton forms the back wall with an upstanding display or advertising panel; and the score or fold line 29 connects with the bottom panel 25 an extension 32 which, in the erected carton, forms the front wall of the carton.

Figure 1:
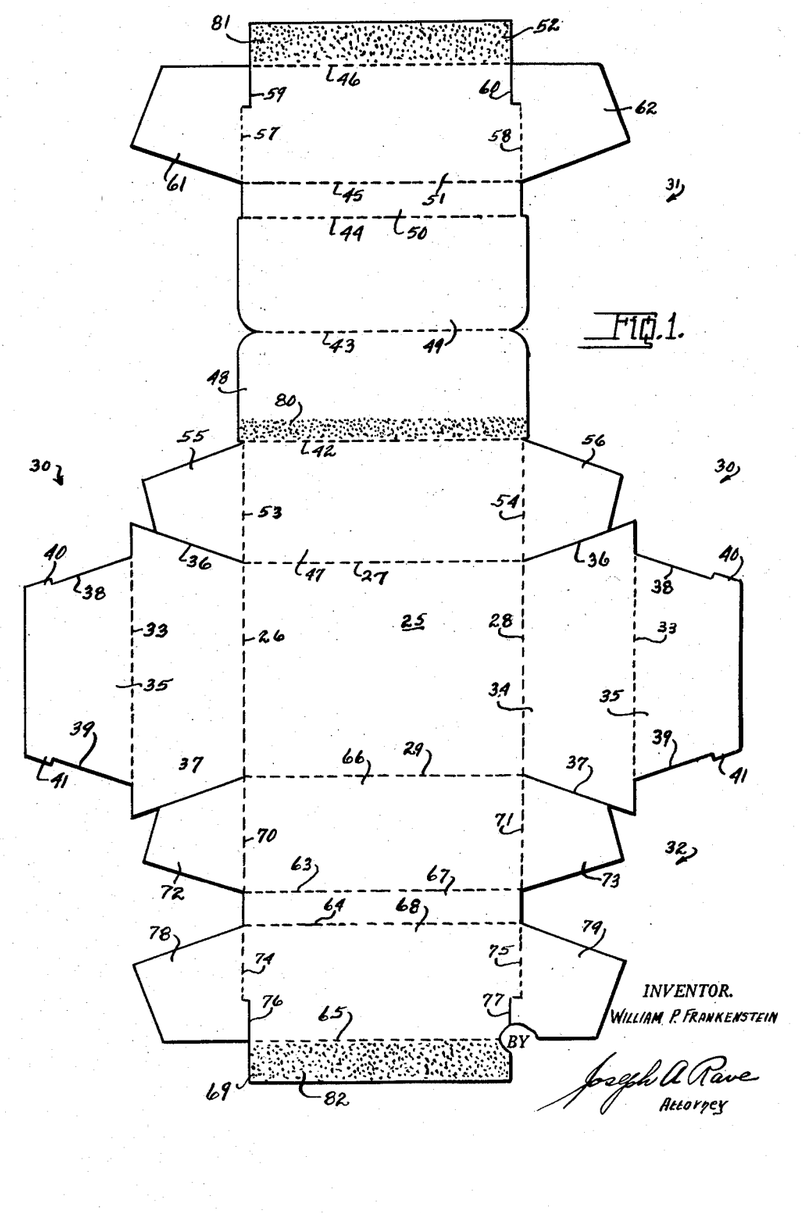
Fig. 1 is an extended plan view of a blank from which one form of a box, carton or basket of the present invention may be erected.

Since the extensions 30 are substantially identical in construction a description of one of them will suffice for the other. Accordingly, the extension 30 is provided substantially midway of its length with a score or fold line 33 thereby providing in said extension a pair of panels 34 and 35. As was noted above the erected box of the present invention has two opposed walls, namely its front and back walls, outwardly flared or diverged with respect to the base or bottom panel 25, wherefore the panel 34, which in the erected carton forms the end wall outer wall member, has its upper edge, as defined by the score or fold line 33, of greater length than the lower end thereof as defined by its hinge connecting line 28. The ends of the said panel 34 outwardly diverge as at 36 and 37 thereby forming the panel 34 as an isosceles trapezoid. As will presently be made clear, the front and back walls are hollow and comprise outer inner wall members spaced from one another, wherefore the inner dimensions of the carton ends are less than the outer dimensions. The panel 35 of each extension 30 forms the end wall inner wall member and is disposed between the front and back wall inner wall members, wherefore its lower end is of lesser length than its upper end formed by the score or fold line 33. The ends of the panel 35 are, in the main, formed by cut lines 38 and 39 which converge from the top end thereof to the bottom in accordance with the convergence of the front and back walls inner walls members. The panel 35 is provided at its outer corners with outwardly projecting locking lugs 40 and 41 which cooperate with suitable locking slits in the front and back walls for holding the carton walls in erected positions as will presently be made clear.

The back wall and display panel extension 31 is provided between the score or fold line 27 and the free edge thereof with a plurality of parallel score or fold lines 42, 43, 44, 45 and 46, thereby providing in said extension panels 47, 48, 49, 50, 51 and 52.

In the erected carton the panel 47 forms the back wall outer wall member and has its lateral or end edges formed by score or fold lines 53 and 54 through which tucking flaps 55 and 56 are respectively integrally hingedly connected therewith. The panels 48 and 49 together form or constitute the display or advertising panel to upstand from the erected carton and may be formed of a length slightly greater than the length of the back wall outer wall member, whereby the said advertising or display panel may be folded on to the top edge of the carton side walls as will subsequently be made clear.

In the erected carton the panel 50 forms the back wall top wall member while the panel 51 forms the back wall inner wall member. The back wall inner wall member has its ends, in the main, formed by score or fold lines 57 and 58 and to a minor extent has its ends formed by inwardly spaced slits or cuts 59 and 60. The said panel 51 through its end score or fold lines 57 and 58 has integrally connected therewith tucking flaps 61 and 62. The slits 59 and 60 upon erection and the folding of the tucking flaps 61 and 62 form, in effect, locking shoulders with which the end walls inner wall members locking lugs 40 cooperate in locking the carton in erected position.

The remaining or front wall extension 32 is provided with a plurality of score or fold lines 63, 64 and 65, thereby providing in said extension, panels 66, 67, 68 and 69. The panel 69 forms in the erected carton the front wall outer wall member which has its ends defined by score or fold lines 70 and 71 and which respectively, integrally, hingedly, connect with the panel 66 tucking flaps 72 and 73. The panel 67 in the erected carton forms the front wall top wall member while the panel 68 forms the front wall inner wall member.

The front wall inner wall member or panel 68 similar to the back wall inner wall member or panel 51 has its ends, in the main, defined by score or fold lines 74 and 75 with said panel 68 having the remaining portions of its ends defined by cut lines or slits 76 and 77. The panel 68 through its end scores or fold lines 74 and 75 has integrally hingedly connected therewith tucking flaps 78 and 79. Upon the folding of said flaps 78 and 79 the slits 76 and 77 form, in effect, locking shoulders that cooperate with the end walls inner wall members locking lugs 41 for locking the carton in erected position.

After the blank of Fig. 1 has been cut and scored as above described one of the display or advertising panel plies, 48 and 49, has applied thereto adhesive 80 while the terminal panels 52 and 69, respectively of the back and front wall extensions 31 and 32, respectively have applied thereto adhesive 81 and 82, whereupon the said blank is folded on the score or fold line 43 and the score or fold line 63. The folding of the blank in such a manner superimposes the portion of the extension 31 upwardly of the said score or fold line 43, as seen in Fig. 1, onto the portions of the blank lying therebelow and superimposes the portion of the extension 32 below the said score or fold line 63 as seen in Fig. 1, onto the portions of the blank above said score or fold line 63. The blank is now in the condition illustrated in Figs. 2 and 3 which is the knocked-down carton. Pressure is now applied to the folded portions of the blank for effecting the adhesive connection of the display or advertising panel plies 48 and 49 and effecting the adhesive securing of the lower ends of the front and back walls inner wall members to the bottom or base panel 25.

It is in this knocked-down position that the carton is shipped to the user for erection by him.

Figure 2:
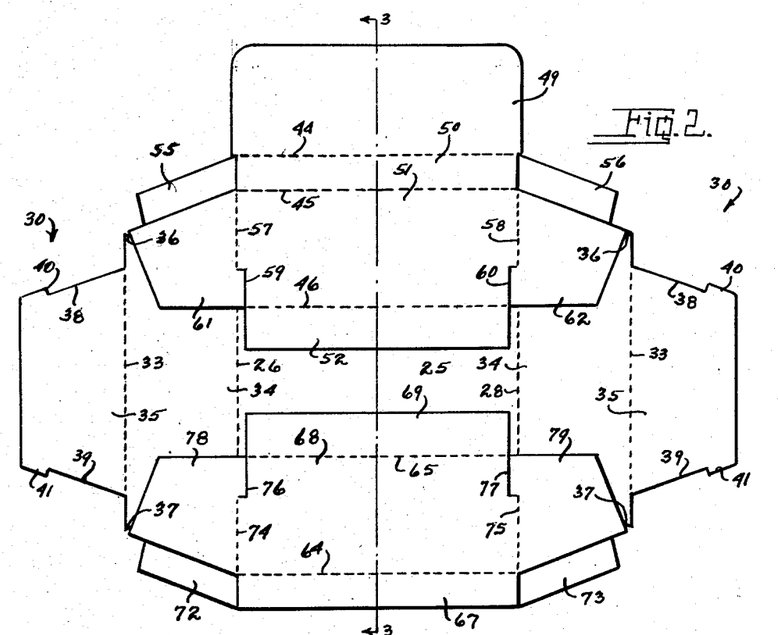
Fig. 2 is a plan view of the blank of Fig. 1 folded to its carton knocked-down position.
Figure 3:
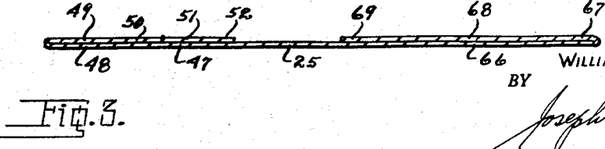
Fig. 3 is a longitudinal sectional view through the blank of Fig. 2 as seen from line 3—3 on said Fig. 2.
Figures 4, 11, 12:
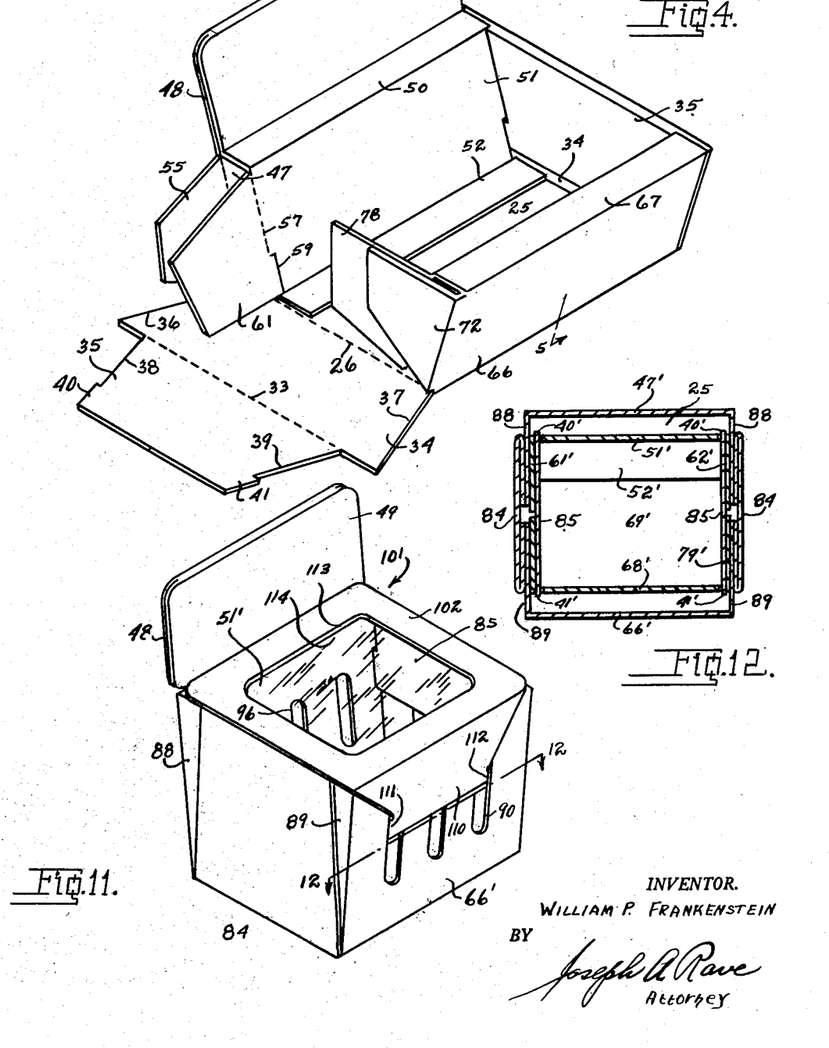
Fig. 4 is a perspective view of a partially erected carton from the knocked-down blank of Fig. 2.
Fig. 11 is a perspective view of the fully erected carton of Fig. 8 having mounted thereon in operative position the lid or cover formed from the blank of Fig. 9.
Fig. 12 is a horizontal sectional view through the carton proper of Fig. 11 as seen from line 12—12 on said Fig. 11.

The user in erecting the carton does so by raising the knocked-down front and back wall extensions from the positions in Figs. 2 and 3 to divergingly upstand from the base or bottom panel 25 as illustrated in Fig. 4. The tucking flaps at opposite ends of the front and back walls inner and outer wall members are then folded to be transversely of the said bottom wall member, as illustrated for the said tucking flaps 72 and 78 of the lower or near, corner of Fig. 4. This operation opens the slits 59, 60, 74 and 75 at the lower opposite corners of the back and front inner wall members. The end walls extensions 30 are then successively actuated from their outward extended position as illustrated in Figs. 1 and 2 which disposes the outer end wall member or panel 34 to be normal to the base or bottom panel 25 and with its back and front edges 36 and 37 aligned with the outer surface of said back and front walls, as illustrated for the right hand end wall in Fig. 4. The end wall inner wall member or panel 35 is then actuated on the score or fold line 30 to depend within the box or carton and have its back and front edges 38 and 39 in contact with the inner surface of the back and front walls inner wall members and with the locking lugs 40 and 41 of said end wall inner wall member in interlocking engagement with the said back and front walls locking shoulders above referred to.

The erection of the back wall to its diverging or upwardly outwardly inclining position automatically so positioned the display and advertising panel 48—49 as illustrated in Fig. 4. The erected carton is now in the position illustrated in Figs. 5 and 6 and ready for the placement therein of goods or merchandise.

Figure 5:
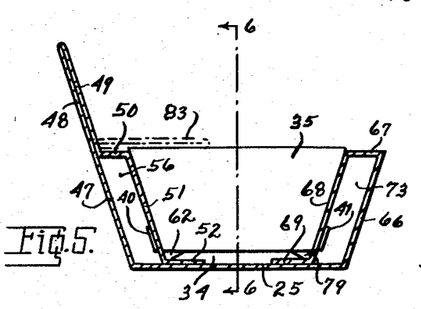
Fig. 5 is a sectional view through the partially erected carton of Fig. 4 as seen from line 5—5 on said Fig. 4.
Figure 6:
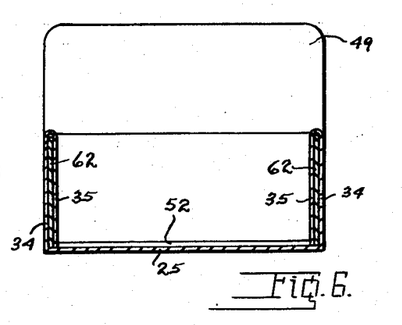
Fig. 6 is a vertical sectional view through the erected carton of Fig. 4 taken at right angles to Fig. 5, as seen from line 6—6 on said Fig. 5.

It will be noted from Figs. 4, 5 and 6 that the merchandise is attractively displayed that the said goods or merchandise has a considerable area of display at the open upper end of the box due to the divergence of the front and back walls. If desired for shipment or carrying purposes the advertising and display panel 48—49 may be folded to the dotted line position 83 of Fig. 5 and thereby partially closing the said open upper end of the box or carton and is convenient in carrying and shipping the box and its merchandise.

Figure 7:
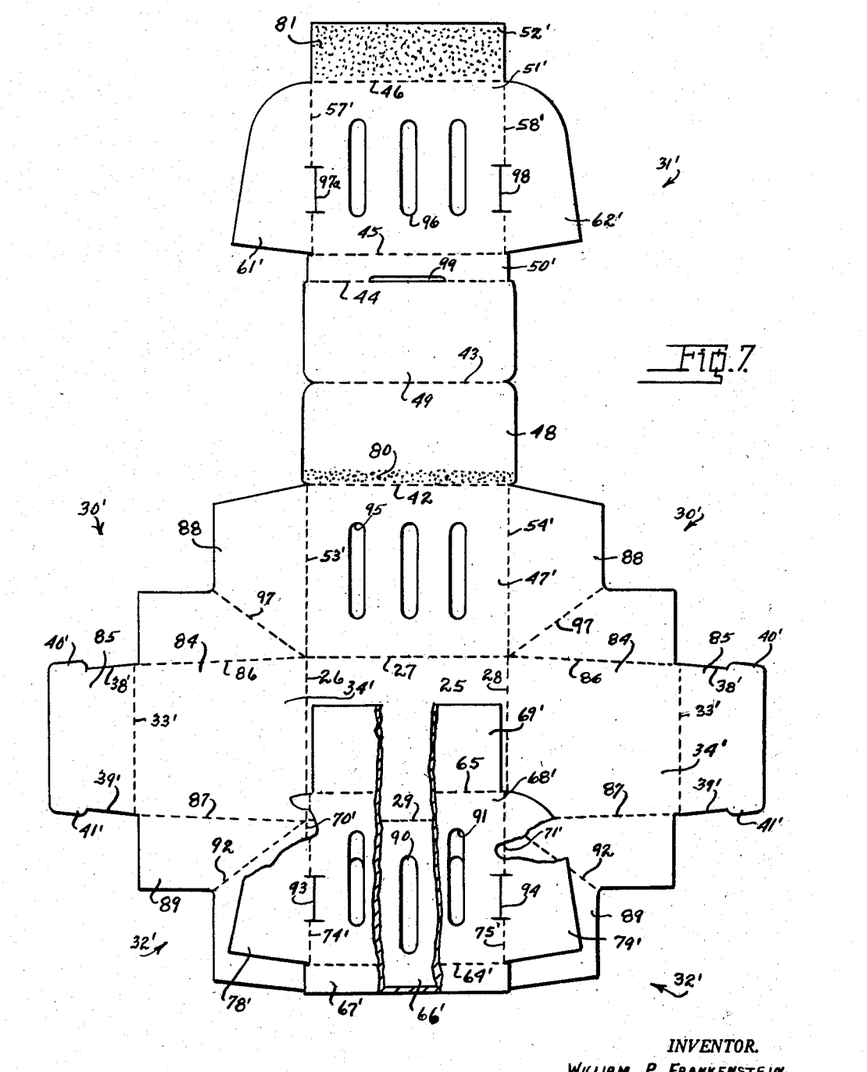
Fig. 7 is a plan view of a modified blank for providing a modified carton embodying the principles of the present invention.

The modified blank illustrated in Fig. 7 is quite similar to that illustrated in Fig. 1 and the common modified elements thereof being indicated by similar reference characters with a prime (') character added. Accordingly the said blank includes a main or bottom panel 25 having its edges defined by score or fold lines 26, 27, 28 and 29 to which the end walls extensions 30', the back wall extension 31', and the front wall extension 32' are integrally, hingedly connected therewith.

The end wall extensions 30' are substantially identical and each includes a transverse score or fold line 33' providing in said extension, panels 84 and 85 which form in the erected carton, respectively, end wall outer wall member and end wall inner wall member. The panel 84 or end wall outer wall member has its side edges defined by score or fold lines 86 and 87 which, dissimilar to the corresponding edges of the corresponding panel in Fig. 1, converge from the ends of the base or bottom panel 25, instead of diverge. The score or fold line 33' establishes the upper end of the said outer wall member and is of a length as established between the inner edges of the front and back walls top walls members. The panel 85 constitutes or forms in the erected carton the end wall inner wall member, and similar to the corresponding member of the blank of Fig. 1, has its side edges 38' and 39' converging with locking lugs 40' and 41' at its outer corners.

The score or fold lines 86 and 87 for the end wall outer wall member or panel 84, in addition integrally hingedly connect therewith corner tabs 88 and 89 which respectively act as tucking tabs 56 and 73 of the blank of Fig. 1.

The front wall extension 32' is modified over that disclosed in Fig. 1 to the extent that its panels 66' and 68' are respectively provided with openings, illustrated in the drawings as elongated apertures 90 and 91 whereby ventilation may be supplied to the interior of the erected carton. It should be here noted that these ventilating apertures may be omitted from the blank of Fig. 7 and from any other of the modifications herein illustrated, and it is further to be noted that said apertures may be applied to the corresponding elements of the blank of Fig. 1 or any other of the modifications herein disclosed that do not specifically illustrate the same.

The said front wall outer wall member or panel 66' through its side score or fold lines 70' and 71' integrally hingedly connect therewith the adjacent edges of the corner pieces 89. The said corner pieces 89 are each provided with a diagonal score or fold line 92 through which said corner pieces may be folded on themselves, bellowswise, in being arranged transversely of the carton. It should be noted that the said positioning of the corner pieces 89 cooperates with the end wall outer wall members or panels 84 in closing the ends of the carton and particularly closing the space of said end as defined by the spaced apart inner and outer wall members of the front and back walls.

In addition the front wall inner wall member or panel 68' is provided with, along its end score or fold lines 74' and 75', with slits 93 and 94 which are shaped, as an I and which are adapted to be opened up by the actuation of the tucking flaps 78' and 79' to receive the end walls inner wall members locking lugs 41'.

The front wall extension 31' has its panels, or the front and back walls outer and inner wall members 47' and 51', similar to the corresponding elements of the front wall, provided with openings in the form of elongated apertures 95 and 96 for the same purpose of the aforementioned apertures 90 and 91. In addition the said back wall outer wall member through its end scores or fold lines 53' and 54' has integral hingedly connected therewith the corner pieces 88, which, similar to the corner pieces 89, are each provided with a diagonal score or fold line 97 whereby the same may be folded bellowswise transversely of the box or carton for the same purpose as corner pieces 89.

The panel 51', similar to the panel 68', of the front wall, is provided on its end scores 57' and 58' with substantially I-shaped slits 97 and 98 to provide locking shoulders for the end walls inner wall members locking lugs 40'.

In the modification of Fig. 7 the said back wall extension 31' is provided in the panel or back wall top wall member 50' with an elongated slit 99 forming in the erected carton a slot for a lid or cover as will presently be made clear.

In the modification illustrated in Fig. 7 the front and back walls inner wall members securing flaps 52' and 69' are illustrated as of greater width than the corresponding members of Fig. 1 wherefore said flaps overlap one another in their operative positions and, in effect, form a reinforcement for the carton base or bottom panel 25.

After the blank has been cut and scored as above described and illustrated in Fig. 7 adhesive 80, 81 and 82 are, respectively, applied to the display and advertising panel plies and to the front and back walls inner wall members secured flaps, whereupon the front wall extension 32' is folded to the position illustrated in Fig. 7 and the said back wall extension is folded on the score or fold line 43 to the position illustrated in Fig. 2 of the corresponding elements of Fig. 1. The blank is now in the position of a knocked-down carton and it is in this position that the same is shipped to the user.

Figure 8:
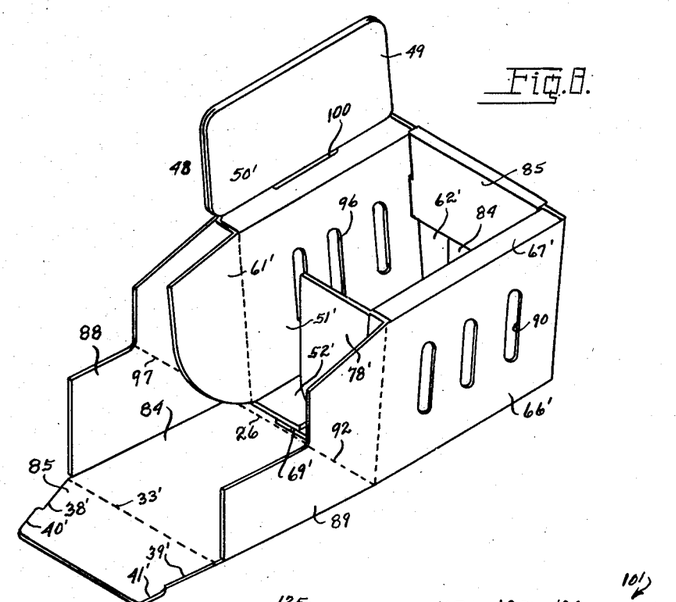
Fig. 8 is a perspective view of a partially erected carton from the blank of Fig. 7.

The knocked-down carton of the blank of Fig. 7 is erected by following the same steps as above set forth for the knocked-down blank of Fig. 2, whereupon the erected carton has the form of that illustrated in Fig. 8. As was noted above the slit or elongated aperture 99 in the back wall top wall member or panel 50', upon erection, forms a slot which communicates with the interior of the said back wall or with the space between its inner and outer wall members and said slot is indicated by the reference numeral 100 in Fig. 8.

As was noted above the slot 100 is employed for attaching to the top of the box or carton a lid or cover such as illustrated in assembled form in Fig. 11 and with said cover indicated in its entirety by the reference numeral 101.

Figure 9:
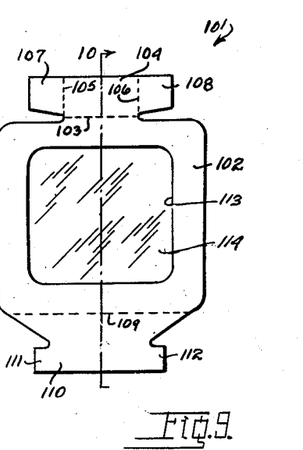
Fig. 9 is a plan view of a blank for forming a top or cover that may be removably secured in position on the erected carton of Fig. 8.

The said cover 101 is formed from a blank illustrated in plan in Fig. 9 and comprises a body portion 102 of an area as defined by the carton outer wall members at the carton upper end. The cover body portion has its one edge defined by a score or fold line 103 which integrally hingedly connects thereto a tab 104. The tab 104 inwardly of its opposite ends is provided with score or fold lines 105 and 106 which provides tongues 107 and 108 in said tab that are integrally hingedly connected therewith. The cover body portion 102 has its opposite edge defined by a score or fold line 109 through which there is integrally, hingedly, connected a flap 110 having locking tongues 111 and 112 at its opposite ends.

Preferably but not necessarily the cover body portion 102 is provided with a central opening 113 desirably covered by transparent material 114 attached to the undersurface of the cover body 102. By this construction the interior of the box or carton upon which it is mounted may be viewed and for exposing to view the contents of the carton.

Figures 20, 22:
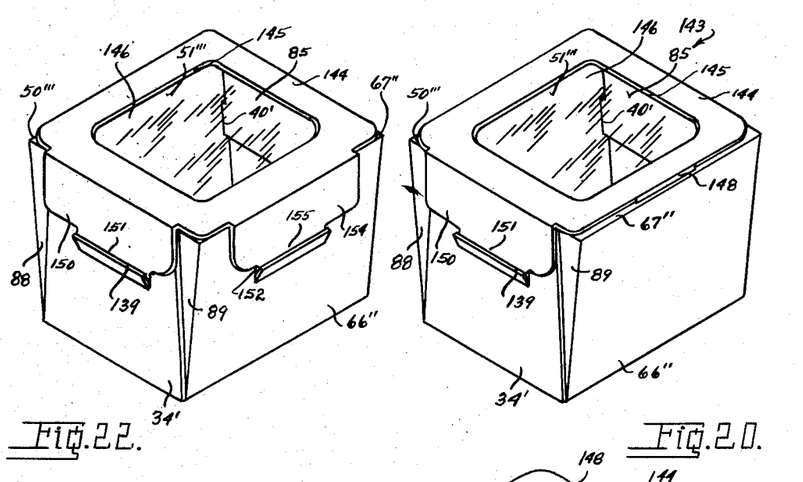
Fig. 20 is a perspective view of an erected carton from the blank of Fig. 19 and having applied thereto a modified lid or cover.
Fig. 22 is a perspective view of an erected carton from a blank slightly modified over that disclosed in Fig. 19 and provided with a modified lid or cover.
Figure 23:
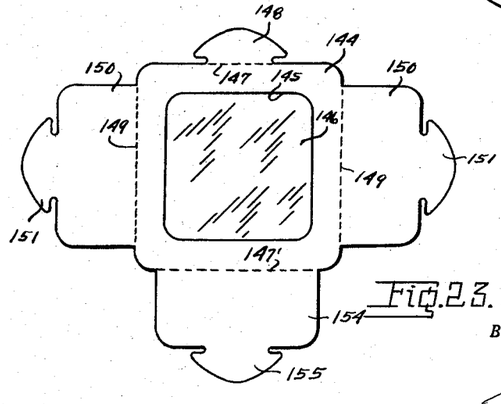
Fig. 23 is an extended plan view of a blank forming a modified cover illustrated in operative position on the erected box or carton in said Fig. 22.

In order to mount the cover 101 on the erected carton of Figs. 8 and 11, the attaching tab ears 107 and 108 are folded on to the central portion of the said tab 104 whereupon the said tab 104 and its ears 107 and 108 are inserted through the slot 100 and the natural spring in the material tends to straighten out said ears 107 and 108 wherefore they underlie the box or carton back wall top wall member 50' for preventing inadvertent disassociation of the cover and carton. The flap 110 is then bent downwardly of the carton front and its fastening tongues 111 and 112 are so designed with respect to the said carton front that they are insertable within the ventilating apertures 90, as illustrated in Fig. 11. It will be appreciated that the said tongues 111 and 112 are relatively narrow thereby not appreciably obstructing ventilation to the interior of the box or carton. It will be understood that if a box or carton is employed that has a solid front wall outer wall member suitable means may be provided for interlocking or connecting said parts, which such means are illustrated in Figs. 22 and 23 and which presently will be described in detail.

The modified blank illustrated in Fig. 13 consists essentially in eliminating from the blank of Fig. 7 the display and advertising panel plies and at the same time providing the erected carton with a double bottom between the front and back inner wall members. This construction results in the front wall extension 32" having eliminated therefrom the front wall top wall member or panel 67, the front wall inner wall member or panel 68 and the glue flap 69 and transferring said panels to the back wall extension 31" as will presently be made clear.

Accordingly the back wall extension 31" is of such length as to include the back wall outer wall member or panel 47", panel or back wall top wall member 50", the back wall inner wall member or panel 51", the base or bottom inner member or panel 115, the front wall inner wall member or panel 68", the front wall top wall member or panel 67" and a terminal glue flap or panel 116. The said panels of the extension 31" are integrally, hingedly connected to one another in succession by score or fold lines 117, 118, 119, 120, 121 and 122.

The end walls extensions 30' are substantially identical with the end wall extensions of Fig. 7 and contain substantially the same elements operable for the same purpose. It will be further noted that the said front and back walls inner and outer wall members are each provided with an elongated aperture similar to the corresponding members of the blank of Fig. 7 and said apertures are similarly identified.

After the blank has been cut and scored as illustrated in Fig. 13 suitable adhesive 123 is applied substantially centrally and longitudinally of the base or bottom inner member 115 and adhesive 124 is applied to the back wall outer wall member or panel 47' just downwardly of its free edge. The glue flap 116 is then folded on the score or fold line 122 to lie upwardly of the blank in Fig. 13 whereupon the said blank is folded on the score or fold line 117 for superimposing the panels therebelow on the panels thereabove and bringing the terminal glue flap 116 into adhesive engagement with adhesive 124 and at the same time adhesive securing the base or bottom inner member 115 onto the main base or bottom 25. The blank of Fig. 13 is now in its carton knocked-down condition and it is in this condition that it is shipped to the user.

Figures 14, 17, 18:
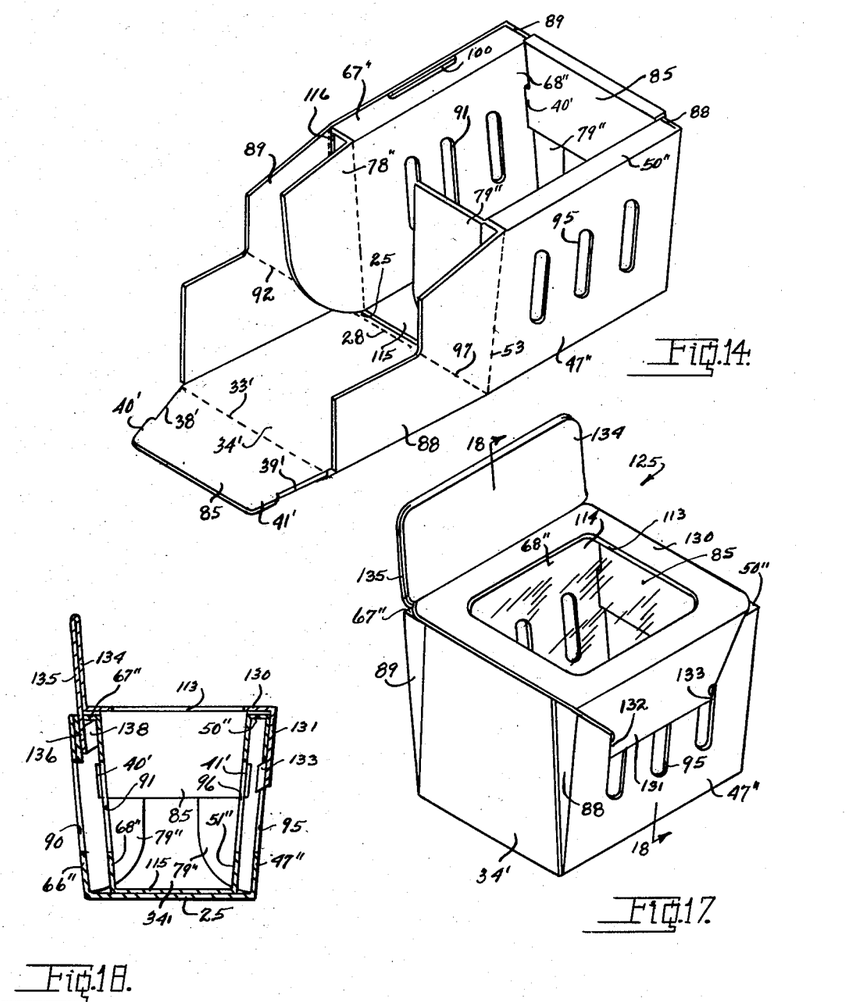
Fig. 14 is a perspective view of a partially erected carton set up from the blank of Fig. 13.
Fig. 17 is a perspective view of a fully erected carton similar to that shown in Fig. 14 and having mounted thereon the cover formed from the blank of Fig. 15.
Fig. 18 is a vertical sectional view through the erected carton of Fig. 17 as seen from line 18—18 on said Fig. 17.
Figure 15:
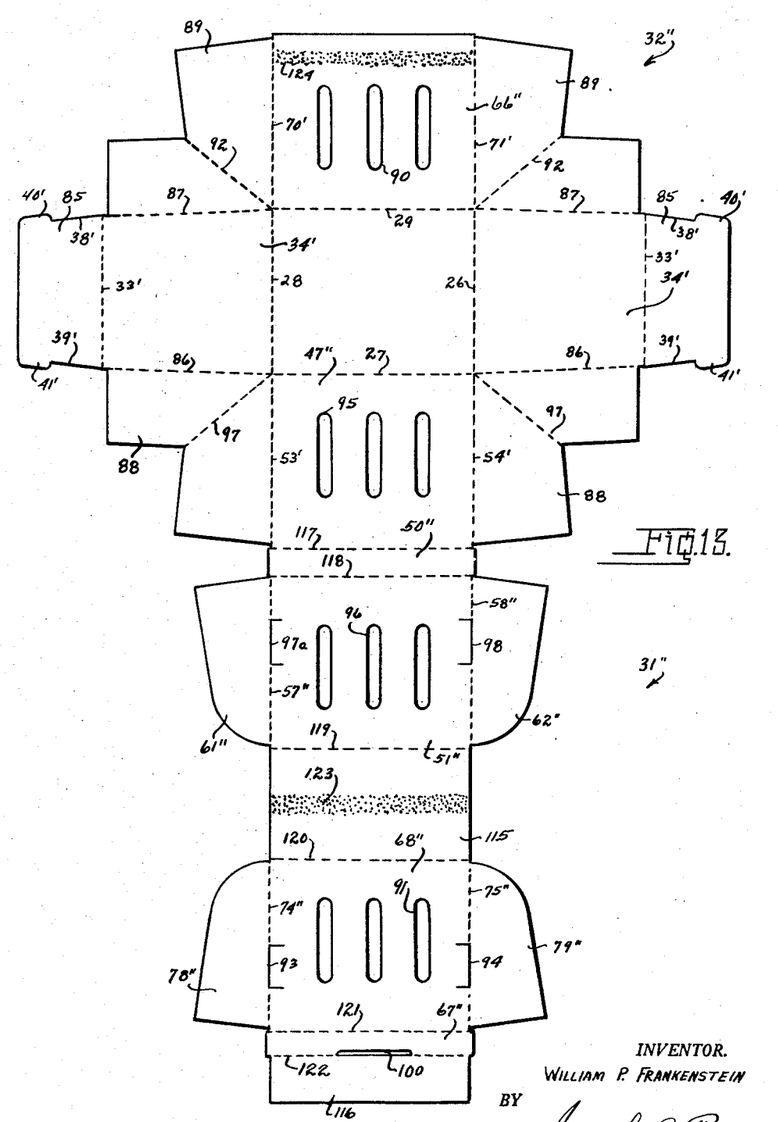

The user sets up the knocked-down carton by following substantially the steps above for erecting a carton such as illustrated in Fig. 14. It will be noted that the erected carton in Fig. 14 is provided in its back wall top wall member with a slot 100 and with which may be employed the lid or cover of Figs. 9 and 10 and which resulting package will be devoid of an advertising or display panel.

Figures 10, 15:
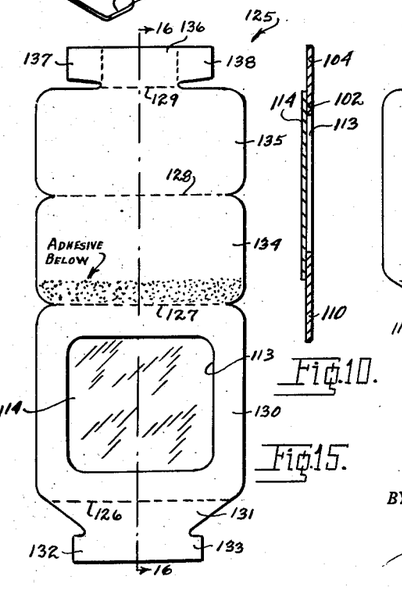
Fig. 10 is a vertical sectional view through the blank of Fig. 9 as seen from line 10—10 on said Fig. 9.
Fig. 15 is an extended plan view of a blank for forming or providing a lid or cover with an advertising panel to be used, for example, with the erected carton of Fig. 14.
Figure 16:
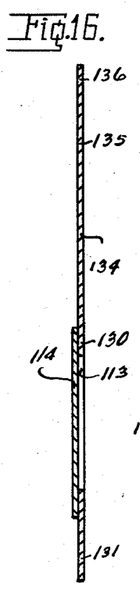
Fig. 16 is a vertical sectional view through the blank of Fig. 15 as seen from line 16—16 on said Fig. 15.

If it is desired to provide the erected carton of Fig. 14 with an advertising and display panel thereabove the said display and advertising panel may be incorporated in the blank of Figs. 9 and 10, as illustrated in Figs. 15 and 16, and which modified cover or lid of Fig. 15 is illustrated in operative position in Fig. 17 and indicated in its entirety by the reference numeral 125.

The modified cover 125 as illustrated in Figs. 15 and 16 comprises an elongated blank transversely divided by score or fold lines 126, 127, 128 and 129 thereby providing in said blank a substantially rectangular panel 130 forming the cover or lid portion which has integrally hingedly connected to one edge through the score or fold line 126 a flap 131 having securing ears 132 and 133 at its outer corners. The cover or lid 130 has integrally hingedly connected to its opposite edge through the score or fold line 127 the advertising and display panels 134 and 135 which are joined to one another by the score or fold line 128. The mounting flap 136 is connected hingedly, with the advertising and display panel ply 135 through the score or fold line 129 with said mounting flap and having integrally, hingedly connected securing ears 137 and 138.

The cover 125, similar to the cover 101, is preferably centrally apertured as at 113 which is closed by a transparent covering 114 whereby the interior of the carton therebeneath is visible.

The said modified cover 125 is secured in operative positions on the box 114 in the same manner as the cover 101 of Fig. 9 is attached to the box of Fig. 8, namely, by bending the attaching ears 137 and 138 onto the attaching lug and inserting same through the slot 100 in the back wall upper wall member 67" of Fig. 14. The cover is locked in closed or operative positions by inserting the front flap tongues 132 and 133 into the outermost ventilating apertures of the box or carton front wall member as illustrated in Fig. 17.

Figure 19:
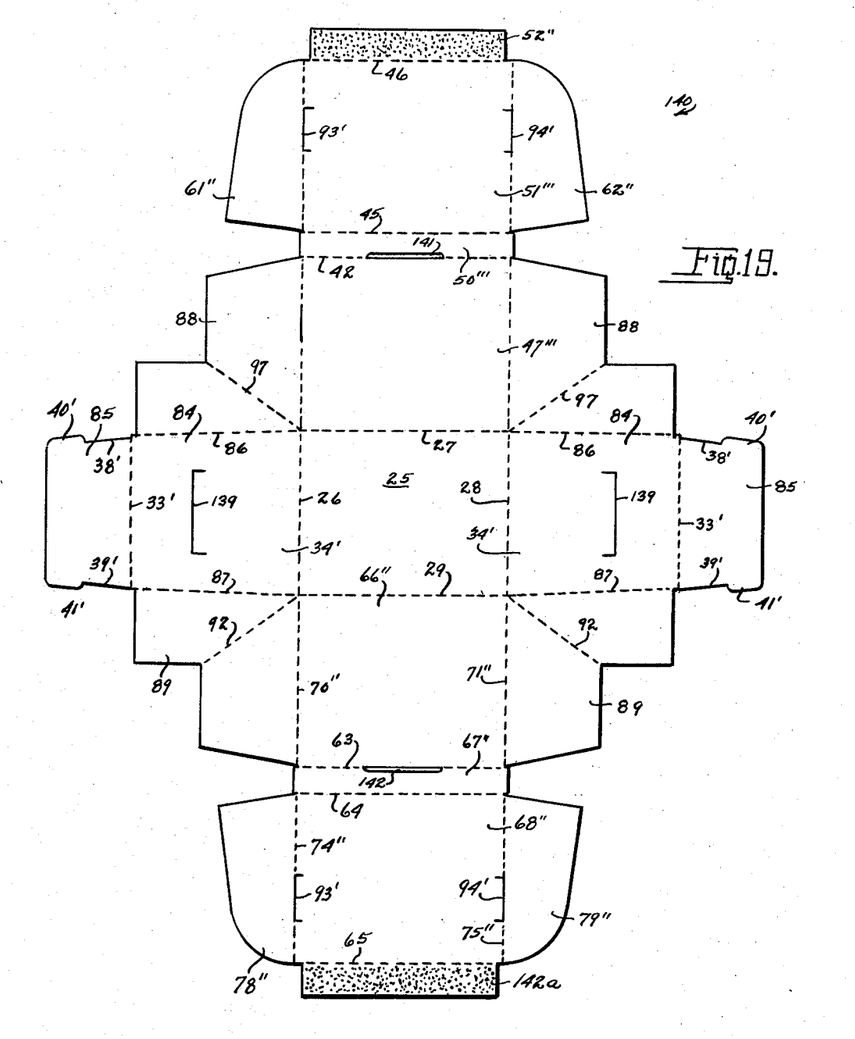
Fig. 19 is an extended plan view of a further modified blank showing further modifications therein for providing a carton embodying the principles of the present invention.

The blank illustrated in Fig. 19 is substantially symmetrical insofar as the end wall extensions and the front and back wall extensions are concerned and is adapted to be used as an open ended box, carton or basket with all of its walls imperforate, as illustrated in the drawings, or perforated as above described. The erected box or carton from said blank of Fig. 19 may be adapted to have removably secured thereto a lid or cover.

Specifically the blank of Fig. 19 comprises a main panel 25 having its edges defined by score or fold lines 26, 27, 28 and 29 with the said score or fold lines integrally hingedly connected to the said base or bottom panel 25 end wall extensions 30' such as illustrated in Fig. 7 and specifically defined above. The said end wall extensions are modified over the disclosure in Fig. 7 to the extent that the panels or end wall outer wall members 84 are each provided with a slit 139 which is substantially U-shaped in plan and provides locking shoulders for the cover locking ears as will presently be made clear.

The said base or bottom panel 25 through its edge score or fold lines 27 and 29 has integrally hingedly connected therewith similar extensions each indicated by the reference numeral 140, and which extensions are each similar to the front wall extension 32' of the above identified blank of Fig. 7. Said extensions 140 are each provided in its top wall member or panel 67" with a slit respectively indicated at 141 and 142. The said extensions 140 are each further modified in that the inner wall members glue flaps 142 are relatively narrow and do not overlap one another upon erection but merely retain the lower ends of said inner wall members to the bottom panel.

The blank of Fig. 19 after being cut and scored as illustrated has adhesive applied to the glue flaps 142 whereupon the said extensions 140 are each, respectively, folded on its score or fold line 63 into carton knocked-down positions.

The user erects the knocked-down carton by following substantially the same steps above set forth resulting in an erected carton such as illustrated in Fig. 20. The carton may be used in this condition with an open upper end of an area greater than the supporting base 25 for the purpose above set forth.

As further illustrated in Fig. 20 the box or carton is provided with a cover indicated in its entirety by the reference numeral 143. The cover 143 is illustrated in Fig. 21 and comprises a main or body portion 144 centrally apertured as at 145 with said aperture closed by a transparent window 146 such as illustrated in Figs. 9 and 10 and above set forth.

Two opposed edges of the lid or cover body portion 144 are, in part, respectively, defined by a similar score or fold line 147 for respectively securing, hingedly, to said body portion attaching lugs 148 which are substantially spear shaped, in plan, and are known in the trade as "flint locks."

The remaining opposite edges of the cover body portion 144 are, likewise, respectively, in the main, defined by a score or fold line 149 which integrally hingedly connects with the said cover body portion flaps 150. The flaps 150 are each provided at its outer or free edge with a locking lug 151 similar in all respects to the "flint lock" above described.

Figure 21:
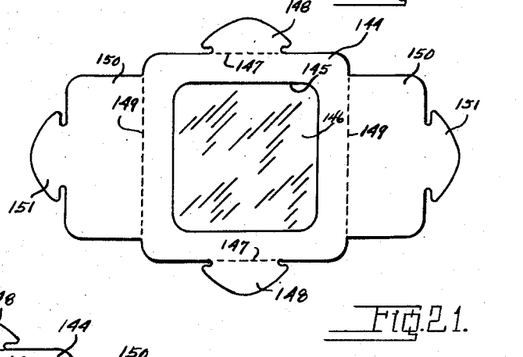
Fig. 21 is an extended plan view of a blank forming a modified lid or cover for use with the erected carton from the blank of Fig. 19 and illustrated in operative position in said Fig. 20.

In operation the flint locks 148 are each downwardly turned, as seen in Fig. 21, and respectively inserted in the slots 141 of the front and back walls. The flaps 150 are each, likewise, downwardly folded and their flint locks 151 inserted in the slits 139 in the carton or box end walls or outer wall members 84.

The modifications illustrated in Figs. 22 and 23 is for the purpose of more securely closing the upper end of the box or carton to prevent even the slightest bowing of the top or cover.

For this purpose and to this extent the blank of Fig. 19 is modified by providing the front wall outer wall member or panel 681 with a slit similar to that in the end walls outer walls members and which slit is illustrated in the erected carton in Fig. 22 and identified by the reference numeral 152.

The lid or cover in Fig. 22, and indicated in its entirety by the reference numeral 153, is modified over that illustrated in Figs. 20 and 21 by eliminating the front locking lug 148 and substituting therefor a closing flap 154 which is substantially identical with the end closing flaps 150, and with said front flap 154 having integral therewith a locking lug 155.

In practice the front closing flap 154 is arranged with respect to the box or carton in the same manner as the end flaps 150 and with its locking lug 155 inserted within the carton front slit 152.

It should be noted that each of the lids or covers herein disclosed is provided with a window opening but the same may be left solid if so desired. It should also be noted that carton covers or lids as illustrated in Figs. 21 and 23 may be provided with the display and advertising panel of Figs. 15 and 16 and that said covers or lids of Figs. 21 and 23 may be utilized with cartons or boxes formed from blanks that incorporate said display and advertising panel such as illustrated in Figs. 1 and 7.

What is claimed is:

1. A carton of the class described erectable from a knocked-down blank comprising a base having length and width, opposed front and back walls upstanding from said base longitudinally thereof, opposed end walls upstanding from the base transversely thereof, said front and back walls each formed of an extension from the base disposed at an upward outward angle and each including an outer wall member having lateral edges, a top wall member, and an inner wall member with said inner and outer wall members of each said walls having their upper ends joined and spaced from one another by its top wall member and with said inner and outer wall members of each said front and back walls, respectively, parallel throughout their length and height and with said inner wall members having their lower ends hingedly connected to the base so that said outer wall member of each front and back wall has its upper end outwardly of the base and the upper end of each of the inner wall members inwardly spaced from its outer wall member upper end an amount substantially equal to the width of its top wall member, said end walls each formed from an extension from and normal to the base and each end wall including an outer wall member and an inner wall member hingedly connected to one another along a common fold line at their upper edges with said end walls outer wall members of a height equal to the height of the front and back walls, said end walls outer wall members each having a length at its lower end equal to the width of the base and having its upper edge of a length equal to the width of the carton between the upper ends of the front and back walls inner wall members and with said end walls outer wall members each having its lateral edges convergingly extending from said base and whereby said front and back walls outer wall members lateral edges and the adjacent lateral edges of the end walls outer wall members diverge from the base, said end walls inner wall members each depending from its outer wall member having its upper edge equal to the length of its outer wall member upper edge and having its lateral edges converging to its lower edge and in contact with the converging inner wall members of the front and back walls, a corner piece between each end wall outer wall member lateral edge and the adjacent lateral edge of a front and a back wall with said corner pieces folded on themselves and transversely of the carton base closing the space between said diverging front and back walls outer wall members and the adjacent lateral edges of the end walls outer wall members, said folded corner pieces being enfolded between the end walls inner and outer wall members, and means on the end walls inner wall members coacting with means on said front and back walls inner wall members locking the walls in erected positions.

2. A carton of the class described erectable from a knocked-down blank comprising a base having length and width, opposed front and back walls upstanding from said base longitudinally thereof, opposed end walls upstanding from the base transversely thereof, said front and back walls each formed of an extension from the base disposed at an upward outward angle and each including an outer wall member having lateral edges, a top wall member, and an inner wall member with said inner and outer wall members of each said walls having their upper ends joined and spaced from one another by its top wall member and with said inner and outer wall members of each said front and back walls, respectively, parallel throughout their length and height and with said inner wall members having their lower ends hingedly connected to the base so that said outer wall member of each front and back wall has its upper end outwardly of the base and the upper end of each of the inner wall members inwardly spaced from its outer wall member upper end an amount substantially equal to the width of its top wall member, said end walls each formed from an extension from and normal to the base and each end wall including an outer wall member and an inner wall member hingedly connected to one another along a common fold line at their upper edges with said end walls outer wall members of a height equal to the height of the front and back walls, said end walls outer wall members each having a length at its lower end equal to the width of the base and having its upper edge of a length equal to the width of the carton between the upper ends of the front and back walls inner wall members and with said end walls outer wall members each having its lateral edges convergingly extending from said base and whereby said front and back walls outer wall members lateral edges and the adjacent lateral edges of the end wall outer wall members diverge from the base, said end walls inner wall members each depending from its outer wall member having its upper edge equal to the length of its outer wall member upper edge and having its lateral edges converging to its lower edge and in contact with the converging inner wall members of the front and back walls, a corner piece between each end wall outer wall member lateral edge and the adjacent lateral edge of a front and a back wall with said corner pieces folded on themselves and transversely of the carton base closing the space between said diverging front and back walls outer wall members and the adjacent lateral edges of the end walls outer wall members, said folded corner pieces being enfolded between the end walls inner and outer wall members, means on the end walls inner wall members coacting with means on said front and back walls inner wall members locking the walls in erected positions, a removable cover for the carton, and means on said cover coacting with means on the carton front and back walls for removably securing the cover in operative position.

3. A carton of the class described erectable from a knock-down blank comprising a base having length and width, opposed front and back walls upstanding from said base longitudinally thereof, opposed end walls upstanding from the base transversely thereof, said front and back walls each formed of an extension from the base disposed at an upward outward angle and each including an outer wall member having lateral edges, a top wall member and an inner wall member with said inner and outer wall members of each said walls having their upper ends joined and spaced from one another by its top wall member and with said inner and outer wall members of each said front and back walls, respectively, parallel throughout their length and height and with said inner wall members having their lower ends hingedly connected to the base so that said outer wall member of each front and back wall has its upper end outwardly of the base and the upper end of each of the inner wall members inwardly spaced from its outer wall member upper end an amount substantially equal to the width of its top wall member, said end walls each formed from an extension from and normal to the base and each end wall including an outer wall member and an inner wall member hingedly connected to one another along a common fold line at their upper edges with said end walls outer wall members of a height equal to the height of the front and back walls, said end walls outer wall members each having a length at its lower end equal to the width of the base and having its upper edge of a length equal to the width of the carton between the upper end of the front and back walls inner wall members and with said end walls each having lateral edges convergingly extending from said base and whereby said front and back walls outer wall members lateral edges and the adjacent lateral edges of the end walls outer wall members diverge from the base, said end wall inner wall members each depending from its outer wall member having its upper edge equal to the length of its outer wall member upper edge and having its lateral edges converging to its lower edge and in contact with the converging inner wall members of the front and back walls, a corner piece between each end wall outer wall member lateral edge and the adjacent lateral edge of a front and a back wall with said corner pieces folded on themselves and transversely of the carton base closing the space between said diverging front and back walls outer wall members and the adjacent lateral edges of the end walls outer wall members, said folded corner pieces being enfolded between the end walls inner and outer wall members, means on the end walls inner wall members coacting with means on said front and back walls inner wall members locking the walls in erected positions, a removable covering for the carton, an upstanding advertising and display panel at one edge of the cover, and means on said cover coacting with means on the carton front and back walls removably securing the cover in operative position.

4. A carton of the class described erectable from a knocked-down blank comprising a base having length and width, opposed front and back walls upstanding from said base longitudinally thereof, opposed end walls upstanding from the base transversely thereof, said front and back walls each formed of an extension from the base disposed at an upward outward angle and each including an outer wall member having lateral edges, a top wall member and an inner wall member with said inner and outer wall members of each of said walls having their upper ends joined and spaced from one another by its top wall member and with said inner and outer wall members of each said front and back walls, respectively, parallel throughout their length and heighth and with said inner wall members having their lower ends hingedly connected to the base so that said outer wall member of each front and back wall has its upper end outwardly of the base and the upper end of each of the inner wall members inwardly spaced from its outer wall member upper end an amount substantially equal to the width of its top wall member, said front and back walls inner and outer wall members each having formed therein aligned elongated apertures to provide ventilation to the interior of the carton, said end walls each formed from an extension from and normal to the base and each end wall including an outer wall member and an inner wall member hingedly connected to one another along a common fold line at their upper edges with said end wall outer wall members of a height equal to the height of the front and back walls, said end walls outer wall members each having a length at its lower end equal to the width of the base and having its upper edge of a length equal to the width of the carton between the upper end of the front and back walls inner wall members and with said end walls outer wall members each having lateral edges convergingly extending from said base and whereby said front and back walls outer wall members lateral edges and the adjacent lateral edges of the end walls outer wall members diverge from the base, said end walls inner wall members each depending from its outer wall member having its upper edge equal to the length of its outer wall member upper edge and having its lateral edges converging to its lower edge and in contact with the converging inner wall members of the front and back walls, a corner piece between each end wall outer wall member lateral edge and the adjacent lateral edge of a front and a back wall with said corner pieces folded on themselves and transversely of the carton base closing the space between said diverging front and back walls outer wall members and the adjacent lateral edges of the end walls outer wall members, said folded corner pieces being enfolded between the end walls inner and outer wall members, and means on the end walls inner wall members coacting with means on said front and back walls inner wall members locking the walls in erected positions.

5. A carton of the class described erectable from a knocked-down blank comprising a base having length and width, opposed front and back walls upstanding from said base longitudinally thereof, opposed end walls upstanding from the base transversely thereof, said front and back walls each formed of an extension from the base disposed at an upward outward angle and each including an outer wall member having lateral edges, a top wall member and an inner wall member with said inner and outer wall members of each said walls having their upper ends joined and spaced from one another by its top wall member and with said inner and outer wall members of each said front and back walls, respectively, parallel throughout their length and heighth and with said inner wall members having their lower ends hingedly connected to the base so that said outer wall member of each front and back wall has its upper end outwardly of the base and the upper end of each of the inner wall members inwardly spaced from its outer wall member end an amount substantially equal to the width of its top wall member, said back wall top wall member having formed therein a slot to the space therebelow, said end walls each formed from an extension from and normal to the base and each end wall including an outer wall member and an inner wall member hingedly connected to one another along a common fold line at their upper edges with said end walls outer wall members of a height equal to the height of the front and back walls, said end walls outer wall members each having a length at its lower end equal to the width of the base and having its upper edge of a length equal to the width of the carton between the upper end of the front and back walls inner wall members and with said end walls outer wall members each having lateral edges convergingly extending from said base and whereby said front and back walls outer wall members lateral edges and the adjacent lateral edges of the end walls outer wall members diverge from the base, said end walls inner wall members each depending from its outer wall member having its upper edge equal to the length of its outer wall member upper edge and having its lateral edges converging to its lower edge and in contact with the converging inner wall members of the front and back walls, a corner piece between each end wall outer wall member lateral edge and the adjacent lateral edge of a front and a back wall with said corner pieces folded on themselves and transversely of the carton base closing the space between said diverging front and back walls outer wall members and the adjacent lateral edges of the end walls outer wall members, said folded corner pieces being enfolded between the end walls inner and outer wall members, means on the end walls inner wall members coacting with means on said front and back walls inner wall members locking the walls in erected positions, a removable cover for the carton, and a cover attaching lug depending from one edge of the cover insertable into the back wall top wall member slot for attaching the cover to the carton.

6. A carton of the class described erectable from a knocked-down blank comprising a base having length and width, opposed front and back walls upstanding from said base longitudinally thereof, opposed end walls upstanding from the base transversely thereof, said front and back walls each formed of an extension from the base disposed at an upward outward angle and each including an outer wall member having lateral edges, a top wall member and an inner wall member with said inner and outer wall members of each said walls having their upper ends joined and spaced from one another by its top wall member and with said inner and outer wall members of each said front and back walls, respectively, parallel throughout their length and heighth and with said inner wall members having their lower ends hingedly connected to the base so that said outer wall member of each front and back wall has its upper end outwardly of the base and the upper end of each of the inner wall members inwardly spaced from its outer wall member upper end an amount substantially equal to the width of its top wall member, said front and back walls inner and outer wall members each having formed therein aligned elongated apertures to provide ventilation to the interior of the carton, said back wall top wall member having formed therein a slot to the space therebelow, said end walls each formed from an extension from and normal to the base and each end wall including an outer wall member and an inner wall member hingedly connected to one another along a common fold line at their upper edges with said end walls outer wall members of a height equal to the height of the front and back walls, said end walls outer wall members each having a length at its lower end equal to the width of the base and having its upper edge of a length equal to the width of the carton between the upper end of the front and back walls inner wall members and with said end walls outer wall members each having lateral edges convergingly extending from said base and whereby said front and back walls outer wall members lateral edges and the adjacent lateral edges of the end walls outer wall members diverge from the base, said end walls inner wall members each depending from its outer wall member having its upper edge equal to the length of its outer wall member upper edge and having its lateral edges converging to its lower edge and in contact with the converging inner wall members of the front and back walls, a corner piece between each end wall outer wall member lateral edge and the adjacent lateral edge of a front and a back wall with said corner pieces folded on themselves and transversely of the carton base closing the space between said diverging front and back walls outer wall members and the adjacent lateral edges of the end walls outer wall members, said folded corner pieces being enfolded between the end walls inner and outer wall members, means on the end walls inner wall members coacting with means on said front and back walls inner wall members for locking the walls in erected positions, a removable cover for the carton, and a fastening lug from each of two opposed edges of the carton respectively insertable in the carton back wall top wall member slot and front wall outer wall member ventilating apertures for removably securing the cover in operative position.

7. A carton of the class described erectable from a knocked-down blank comprising a base having length and width, opposed front and back walls upstanding from said base longitudinally thereof, opposed end walls upstanding from the base transversely thereof, said front and back walls each formed of an extension from the base disposed at an upward outward angle and each including an outer wall member having lateral edges, a top wall member and an inner wall member with said inner and outer wall members of each said walls having their upper ends joined and spaced from one another by its top wall member and with said inner and outer wall members of each said front and back walls, respectively, parallel throughout their length and heighth and with said inner wall members having their lower ends hingedly connected to the base so that said outer wall member of each front and back wall has its upper end outwardly of the base and the upper end of each of the inner wall members inwardly spaced from its outer wall member upper end an amount substantially equal to the width of its top wall member, said end walls each formed from an extension from and normal to the base and each end wall including an outer wall member and an inner wall member hingedly connected to one another along a common fold line at their upper edges with said end walls outer wall members of a height equal to the height of the front and back walls, said end walls outer wall members each having a length at its lower end equal to the width of the base and having its upper edge of a length equal to the width of the carton between the upper end of the front and back walls inner wall members and with said end walls outer wall members each having lateral edges convergingly extending from said base and whereby said front and back walls outer wall members lateral edges and the adjacent lateral edges of the end walls outer wall members diverge from the base, said end walls inner wall members each depending from its outer wall member having its upper edge equal to the length of its outer wall member upper edge and having its lateral edges converging to its lower edge and in contact with the converging inner wall members of the front and back walls, a corner piece between each end wall outer wall member lateral edge and the adjacent lateral edge of a front and a back wall with said corner pieces folded on themselves and transversely of the carton base closing the space between said diverging front and back walls outer wall members and the adjacent lateral edge of the end walls outer wall members, said folded corner pieces being enfolded between the end walls inner and outer wall members, means on the end walls inner wall members coacting with means on said front and back walls inner wall members for locking the walls in erected positions, and a display and advertising panel upstanding above the back wall.

8. A carton of the class described erectable from a knocked-down blank comprising a base having length and width, opposed front and back walls upstanding from said base longitudinally thereof, opposed end walls upstanding from the base transversely thereof, said front and back walls each formed of an extension from the base disposed at an upward outward angle and each including an outer wall member having lateral edges, a top wall member and an inner wall member with said inner and outer wall members of each said walls having their upper ends joined and spaced from one another by its top wall member and with said inner and outer wall members of each said front and back walls, respectively, parallel throughout their length and heighth and with said inner wall members having their lower ends hingedly connected to the base so that said outer wall member of each front and back wall has its upper end outwardly of the base and the upper end of each of the inner wall members inwardly spaced from its outer wall member upper end an amount substantially equal to the width of its top wall member, said end walls each formed from an extension from and normal to the base and each end wall including an outer wall member and an inner wall member hingedly connected to one another along a common fold line at their upper edge with said end walls outer wall members of a height equal to the height of the front and back walls, said end walls outer wall members each having a length at its lower end equal to the width of the base and having its upper edge of a length equal to the width of the carton between the upper end of the front and back walls inner wall members and with said end walls outer wall members each having lateral edges convergingly extending from said base and whereby said front and back walls outer wall members lateral edges and the adjacent lateral edges of the end walls outer wall members diverge from the base, said end walls inner wall members each depending from its outer wall member having its upper edge equal to the length of its outer wall member upper edge and having its lateral edges converging to its lower edge and in contact with the converging inner wall members of the front and back walls, a corner piece between each end wall outer wall member lateral edge and the adjacent lateral edge of a front and a back wall with said corner pieces folded on themselves and transversely of the carton base closing the space between said diverging front and back walls outer wall members and the adjacent lateral edges of the end walls outer wall members, said folded corner pieces being enfolded between the end walls inner and outer wall members, means on said end walls inner wall members coacting with means on said front and back walls inner wall members locking the walls in erected positions, and a display and advertising panel formed of ply panels respectively integral with the back wall outer wall member and back wall top wall member.

9. A carton of the class described erectable from a knock-down blank comprising a base having length and width, opposed front and back walls upstanding from said base longitudinally thereof, opposed end walls upstanding from the base transversely thereof, said front and back walls each formed of an extension from the base disposed at an upward outward angle and each including an outer wall member having lateral edges, a top wall member and an inner wall member with said inner and outer wall members of each said walls having their upper ends joined and spaced from one another by its top wall member and with said inner and outer wall members of each said front and back walls, respectively, parallel throughout their length and heighth and with said inner wall members having their lower ends hingedly connected to the base so that said outer wall member of each front and back wall has its upper end outwardly of the base and the upper end of each of the inner wall members inwardly spaced from its outer wall member upper end an amount substantially equal to the width of its top wall member, said end walls each formed from an extension from and normal to the base and each end wall including an outer wall member and an inner wall member hingedly connected to one another along a common fold line at their upper edge with said end walls outer wall members of a height equal to the height of the front and back walls, said end walls outer wall members each having a length at its lower end equal to the width of the base and having its upper edge of a length equal to the width of the carton between the upper end of the front and back walls inner wall members and with said end walls outer wall members each having lateral edges convergingly extending from said base and whereby said front and back walls outer wall members lateral edges and the adjacent lateral edges of the end walls outer wall members diverge from the base, said end walls inner wall members each depending from its outer wall member having its upper edge equal to the length of its outer wall member upper edge and having its lateral edges converging to its lower edge and in contact with the converging inner wall members of the front and back walls, a corner piece between each end wall outer wall member lateral edge and the adjacent lateral edge of a front and a back wall with said corner pieces folded on themselves and transversely of the carton base closing the space between said diverging front and back walls outer wall members and the adjacent lateral edges of the end walls outer wall members, said folded corner pieces being enfolded between the end walls inner and outer wall members, means on the end walls inner wall members coacting with means on said front and back walls inner wall members for locking the walls in erected positions, a display and advertising panel formed of ply panels respectively integral with the back wall outer wall member and back wall top wall member, said back wall top wall member having formed therein a slot to the space therebelow, and a removable cover for the carton having a lug depending from one edge thereof disposed in said carton back wall top wall member slot for securing the same to the carton.

10. A carton of the class described erectable from a knocked-down blank comprising a base having length and width, opposed front and back walls upstanding from said base longitudinally thereof, opposed end walls upstanding from the base transversely thereof, said front and back walls each formed of an extension from the base disposed at an upward outward angle and each including an outer wall member having lateral edges, a top wall member and an inner wall member with said inner and outer wall members of each said walls having their upper ends joined and spaced from one another by said top wall member and with said inner and outer wall members of each said front and back walls, respectively, parallel throughout their length and heighth and with said inner wall members having their lower ends hingedly connected to the base so that said outer wall member of each front and back wall has its upper end outwardly of the base and the upper end of each of the inner wall members inwardly spaced from its outer wall member upper end an amount substantially equal to the width of its top wall member, said front and back walls inner and outer wall members each having formed therein aligned elongated apertures to provide ventilation to the interior of the carton, said back wall top wall member having formed therein a slot to the space therebelow, said end walls each formed from an extension from and normal to the base and each end wall including an outer wall member and an inner wall member hingedly connected to one another along a common fold line at their upper edge with said end walls outer wall members of a height equal to the height of the front and back walls, said end walls outer wall members each having a length at its lower end equal to the width of the base and having its upper edge of a length equal to the width of the carton between the upper end of the front and back walls inner wall members and with said end walls outer wall members each having lateral edges convergingly extending from said base and whereby said front and back walls outer wall members and adjacent lateral edges of the end walls outer wall members diverge from the base, said end walls inner wall members each depending from its outer wall member having its upper edge equal to the length of its outer wall member upper edge and having its lateral edges converging to its lower edge and in contact with the converging inner wall members of the front and back walls, a corner piece between each end wall outer wall member lateral edge and the adjacent lateral edge of a front and a back wall with said corner pieces folded on themselves and transversely of the carton base closing the space between said diverging front and back walls outer wall members and the adjacent lateral edges of the end walls outer wall members, said folded corner pieces being enfolded between the end walls inner and outer wall members, means on the end walls inner wall members coacting with means on said front and back walls inner wall members for locking the walls in erected positions, a display and advertising panel formed of ply panels respectively integral with the back wall outer wall member and back wall top wall member, a removable cover for the carton, and a fastening lug from two opposed edges of the carton respectively insertable in the carton back wall top wall member slot and front wall outer wall member ventilating apertures for removably securing the cover in operative position.

References Cited in the file of this patent

UNITED STATES PATENTS

| | | |
|---|---|---|
| Re. 21,158 | Frankenstein | July 25, 1939 |
| 1,211,223 | Pinkerton | Jan. 2, 1917 |
| 1,460,132 | Horr | June 26, 1923 |
| 1,521,796 | Spittell | Jan. 6, 1925 |
| 1,917,132 | Lombarde | July 4, 1933 |
| 2,531,255 | Clarke | Nov. 21, 1950 |
| 2,588,377 | Frankenstein | Mar. 11, 1952 |
| 2,614,746 | Frankenstein | Oct. 21, 1952 |
| 2,628,012 | Goldsholl | Feb. 10, 1953 |
| 2,645,353 | Anderson | July 14, 1953 |
| 2,668,654 | Freel | Feb. 9, 1954 |